United States Patent [19]

Kindervater et al.

[11] 4,220,567
[45] Sep. 2, 1980

[54] STABILIZING PIGMENTED LACQUERS WITH ZEOLITES

[75] Inventors: Friedrich Kindervater; Günter Ulisch; Theodor Bohmann, all of Leverkusen; Manfred Mengel, Cologne; Lothar Puppe, Leverkusen, all of Fed. Rep. of Germany

[73] Assignee: Bayer Atkiengesellschaft, Leverkusen, Fed. Rep. of Germany

[21] Appl. No.: 911,010

[22] Filed: May 30, 1978

[30] Foreign Application Priority Data

Jun. 15, 1977 [DE] Fed. Rep. of Germany ....... 2726888

[51] Int. Cl.² .................. C09D 1/02; C09D 3/64
[52] U.S. Cl. .................... 260/22 A; 260/29.1 R; 260/42.15; 260/42.44; 260/42.57; 260/DIG. 33
[58] Field of Search ............. 260/22 A, 29.1 R, 42.15, 260/42.57, 42.44, DIG. 33

[56] References Cited

U.S. PATENT DOCUMENTS

| | | | |
|---|---|---|---|
| 2,848,346 | 8/1958 | Bertorelli | 106/288 B |
| 2,877,130 | 3/1959 | Caron et al. | 260/22 A |
| 3,037,875 | 6/1962 | Geiser | 260/22 A |
| 3,037,881 | 6/1962 | McDowell | 428/448 |
| 3,484,401 | 12/1969 | Rudolph et al. | 260/22 A |
| 3,509,082 | 4/1970 | Mays | 260/22 A |
| 3,755,222 | 8/1973 | Gruber et al. | 260/DIG. 33 |

FOREIGN PATENT DOCUMENTS 983215 2/1965 United Kingdom ............ 260/DIG. 33

OTHER PUBLICATIONS

Chemical Abstracts, vol. 81, No. 12, Sep. 23, 1974, p. 64724u.
Chemical Abstracts, vol. 83, No. 16, Oct. 20, 1975, p. 133530h.

Primary Examiner—Ronald W. Griffin
Attorney, Agent, or Firm—Sprung, Felfe, Horn, Lynch & Kramer

[57] ABSTRACT

A lacquer comprising an organic binder, at least one pigment or filler, and a zeolite in an amount sufficient to increase the dispersibility of the pigment or filler. Advantageously the pigment is at least one of titanium dioxide, iron oxide and mixed-phase rutile, and the binder is a polyester. Desirably the pigment is present in from about 1 to 5% by volume of the pigment plus any filler and its average particle size is from about 1 to 3 μm.

6 Claims, No Drawings

STABILIZING PIGMENTED LACQUERS WITH ZEOLITES

Pigmented and/or filler-containing lacquers based primarily on synthetic resins are widely used for lacquering and coating purposes.

One problem of such lacquers is that, on standing and particularly in the event of prolonged storage, the finely dispersed pigment or filler particles show a tendency to flocculate, i.e. to coalesce into fairly large agglomerates.

Pigments and fillers (for a definition of "pigments" and "fillers", see DIN 55 944) are only able optimally to perform their function when the individual particles are completely dispersed in the coating system. It is only then that pigments are able to develop their maximum optical properties, for example covering power, lightening power and coloring strength, and fillers their maximum delustering and/or thickening effect.

If, however, the pigments or fillers flocculate in the lacquer, these properties are adversely affected, in addition to which the surface gloss of the applied lacquer is reduced, pigment mixtures swell up and flood and sediments that are difficult to stir are formed. These sediments can only be redispersed with considerable effort.

The flocculation, i.e. agglomeration, of dispersed pigment or filler particles can be attributed to various factors. In any event, it is caused by changes occurring at the solid/liquid interface.

In order to prevent the flocculation of finely divided solids in lacquers, it is important, in particular, to improve the surface wetting of the solid particles by the addition of wetting agents or dispersants. Wetting agents or dispersants are substances which preferentially accumulate at the pigment/binder interface. However, these surface-active substances have the disadvantage that they are highly specific in their effect.

The object of the present invention is to improve the degree of dispersion in lacquers and to prevent flocculation of the pigments and/or fillers present in lacquers.

Accordingly, the present invention provides lacquers based on organic binders which contain pigments and/or fillers and also the usual lacquer auxiliaries, characterized in that they contain zeolites.

The present invention also provides a process for the production of pigment- and/or filler-containing lacquers based on organic binders, characterized in that zeolite is mixed into the lacquers in quantities of about 0.1% to 10% by volume, based on the sum of pigment and filler.

The invention also relates to the use of zeolite-and pigment and/or filler-containing lacquers based on organic binders for surface lacquers, preferably industrial surface lacquers.

It has surprisingly been found that additions of zeolites considerably suppress or completely prevent the flocculation of finely divided pigments and/or fillers while at the same time improving the dispersibility of these solids.

Zeolites are natural or synthetic crystalline alumosilicates and are described for example by D. W. Breck in Zeolite Molecular Sieves, John Wiley & Sons, Inc. New York, 1974.

They are characterized by a rigid three dimensional network consisting of $SiO_4$ and $AlO_4$-tetrahedrons. This network leaves free in its interior large adsorption cavities which are interconnected by channels known as pores. Polar or polarizable molecules smaller in diameter than the pores of the particular zeolite can be reversibly adsorbed in the adsorption cavities. By virtue of its high polarity and its small molecule diameter, water is adsorbed with particular preference, which is why zeolites are highly effective drying agents.

Zeolites can be characterized by the general formula (I):

$$(1.0 \pm 0.2) \frac{M_2O}{n} \cdot Al_2O_3 \cdot xSiO_2 \quad (I)$$

in which M is generally a metal having the valency state n, for example $Na^+$, $K^+$, $Ca^{2+}$, or a hydrogen ion, an ammonium ion or an alkylammonium ion, and x has values of 1.5 to approximately 6.

In the context of this invention, preferred synthetic zeolites are zeolite A and faujasite. Zeolite A is a crystalline alumosilicate with the following composition:

$$(1.0 \pm 0.2) \frac{M_2O}{n} \cdot Al_2O_3 \cdot (1.85 \pm 0.5)SiO_2$$

its pore diameter amounting to between 3 and 5 Å, depending upon the cation incorporated.

Synthetic faujasite has the general composition:

$$(1.0 \pm 0.2) \frac{M_2O}{n} \cdot Al_2O_3 \cdot xSiO_2$$

Synthetic faujasites with values for x of 2 to 3 are generally known as zeolite X, while synthetic faujasites having values for x of from 3 to 6 are known as zeolite Y.

In one embodiment of the process according to this invention, about 0.5 to 10% by volume and preferably about 1 to 5% by volume of zeolite, based on the sum of pigment and filler, is added either to the pigment or filler. The average particle size of the zeolite used remains in the range from about 0.5 to 5 $\mu$m and preferably in the range from about 1 to 3 $\mu$m. The pigment and/or filler may be mixed with the zeolite in dry form, for example. It is also possible to incorporate the zeolite in the lacquer at the same time as the pigment and/or filler. The zeolite may be added as a powder or in the form of a so-called master batch, i.e. in the form of a binder preparation, during production of the lacquer.

In one preferred embodiment of the present invention, the zeolite is used in lacquers containing iron oxide and/or titanium dioxide pigments. Suitable iron oxide pigments are, in particular, iron oxide red pigments with the composition $Fe_2O_3$.

Mixed-phase rutile pigments with the composition (Ti, Ni, Sb)$O_2$ or (Ti, Cr, Sb)$O_2$ are eminently suitable for use in lacquers in conjuction with zeolite.

Suitable lacquer systems are air-drying and/or oven-drying lacquers, for example based on saturated polyesters, lacquer systems with a particular tendency towards flocculation in view of their composition being particularly preferred.

Air drying or oven drying lacquers based on alkyd resins are particularly suitable for the purposes of the invention. The lacquers may contain the usual lacquer additives for example wetting agents, in the usual quantities.

After drying, the lacquers according to the invention have a high degree of gloss and are eminently suitable for industrial surface lacquers, such as automobile lacquers.

The invention is illustrated by the following examples:

EXAMPLE 1

This example is intended to demonstrate that an addition of a few percent of the finely divided zeolite described previously considerably modifies the sedimentation behavior of a chrome rutile yellow in toluene.

100 g of this pigment were shaken for 1 hour with approximately 1 liter of toluene and left standing for 48 hours in a 1 liter measuring cylinder for the purposes of sedimentation. Table 1 shows the sedimentation volumes determined thereafter:

Table 1:

| Without addition of zeolite | With addition of 1 g of zeolite | With addition of 2.5 g of zeolite | With addition of 5.0 g of zeolite |
|---|---|---|---|
| 160 ml | 200 ml | 480 ml | 480 ml |

(sedimentation volume in ml)

It can be seen that the zeolite-free pigment granulates and undergoes heavy sedimentation (= low sedimentation volume). With zeolite A added in the quantity indicated, the pigment shows little or no granulation; it sediments only loosely and its sedimentation volume is considerably greater than that of the zeolite-free pigment.

The following examples are intended to demonstrate the improvement obtained in the surface gloss of the applied lacquer by the addition of zeolite A:

EXAMPLE 2

A lacquer mixture consisting of
  20.5 g of a long-oil air-drying alkyd resin, for example based on drying vegetable fatty acids (oil content ~ 60%) (70% in white spirit);
  27.3 g of white spirit;
  125 g of iron oxide red;
was dispersed for 15, 30, 60 and 120 minutes in a disperser filled with 200 g of glass balls (approximately 1mm in diameter). 6.2 g of this mixture were then mixed while stirring gently with 13.4 g of the following lacquer mixture:

22.11 g of alkyd resin based on drying vegetable fatty acids (oil content 60%) (70% in white spirit);
  3.69 g of white spirit;
  0.15 g of silicone oil (1% in xylene);
  0.4 g of oxime (65% in white spirit);
  0.34 g of lead naphthenate, 24% Pb; and
  0.11 g of cobalt naphthenate, 6% Co.

The lacquer thus obtained was coated onto a suitable substrate, for example glass plates, in a wet film thickness of approximately 120 μm immediately and after standing for one week, and left to dry for approximately 24 hours.

The lacquer had a pigment volume concentration (PVC) after drying of 10%.

In a corresponding mixture, 2.5% by volume of the iron oxide pigment were replaced by zeolite A. The lacquer was dispersed and worked up in exactly the same way as before.

EXAMPLE 3

The procedure was as described in Example 2, except that the lacquer mixture consists of:
  30.0 g of a short-oil alkyd resin based on ricinene oil (oil content approximately 32%) (60% in xylene);
  19.0 g of xylene;
  4.0 g of 2-butoxi-ethanol $CH_3$-$(CH_2)_3$-O-$(CH_2)_2$-OH
  7.0 g of butanol; and
  83.1 g of iron oxide red.

After dispersion, 4.7 g of this mixture were made into a lacquer with 9.3 g of the following mixture:
  19.7 g of alkyd resin based on ricinene oil (60% in xylene);
  7.3 g of melamine resin (55%);
  0.5 g of 2-butoxi-ethanol and
  0.4 g of silicone oil (1% in xylene).

The lacquer thus obtained was coated onto a suitable substrate, for example glass plates, in a wet film thickness of approximately 120 μm immediately and after standing for one week, and was then stoved for 30 minutes at 120° C.

This lacquer had a PVC of 10%.

In a corresponding mixture, 2.5% by volume of the iron oxide pigment were replaced by zeolite A. The lacquer was dispersed and worked up in exactly the same way as before.

EXAMPLE 4

The lacquer mixture and procedure were the same as in Example 3, except that, instead of the iron oxide red pigment, a chrome rutile yellow pigment was used in a quantity of 71.5 g. In a corresponding mixture, 2.5% by volume of the pigment were replaced by zeolite A.

EXAMPLE 5

The procedure was as described in Example 2, except that the following lacquer mixture was used:
  50.0 g of a short-oil alkyd resin based on saturated fatty acid (oil content approximately 32%) (60% in xylene);
  18.0 g of melamine resin (55%);
  1.5 g of 2-butoxi-ethylacetate $C_4H_9$—O—$(CH_2)_2$—O—CO—$CH_3$
  2.5 g of butanol;
  2.5 g of 2-ethoxi-ethanol $CH_3$-$CH_2$-O-$(CH_2)_2$-OH
  1.5 g of tetralin;
  0.4 g of silicone oil (1% in xylene); and
  33.5 g of chrome rutile yellow pigment.

After dispersion in a disperser, the lacquer obtained was directly coated onto glass plates and stoved for 30 minutes at 120° C.

This lacquer had a PVC of 18%.

In a corresponding mixture, 2.5% by volume of the light yellow pigment were replaced by zeolite A. The lacquer was dispersed and worked up in the same way as before.

EXAMPLE 6

The procedure was as described in Example 5, except that the zeolite used was a zeolite of type Y. The lacquers obtained in accordance with Examples 2 to 6 were tested for surface gloss with one of the usual gloss meters. To intensify the test, the lacquers of Examples 3 to 6 oven dried at 120° C. may be stored for another 30 minutes at 150° C. This causes the lacquer to shrink, showing up any coarse particles or flocculates still present. Their presence leads to a more or less pronounced reduction in the original surface gloss.

The surface gloss measurements shown in Table 2 were obtained from the lacquer coatings obtained in accordance with Examples 2 to 6. Measurement was carried out with a Gardener gloss meter with an incidence emergence angle of 20° C.

The lacquers were shaken for 15, 30, 60 and 120 minutes before each application to see the effect of shaking as well as the effect of zeolite on the shaking time.

The values set out in Table 2 show that the described addition of zeolite during production of the lacquer distinctly increases the surface gloss of the lacquer coatings obtained, i.e. improves the dispersibility of the pigments by preventing flocculation.

In addition, Example 2 shows that the described addition of zeolite enables the obtainable level of surface gloss to be reached in a considerably shorter time. This also represents a significant improvement in the dispersibility of the pigments.

The effect described in the case of Example 2 enables dispersion energy and time to be saved in the production of lacquers.

It will be appreciated that the instant specification and examples are set forth by way of illustration and not limitation, and that various modifications and changes may be made without departing from the spirit and scope of the present invention.

What is claimed is:

1. A lacquer comprising a saturated polyester, at least one pigment or filler, and a crystalline zeolite in an amount sufficient to increase the dispersibility of the pigment or filler, the zeolite having an average particle size of about 0.5 to 5 μm.

2. A lacquer according to claim 1, wherein the zeolite is present in from about 0.1 to 10% by volume of any pigment plus filler present.

3. A lacquer according to claim 1, wherein the zeolite is a faujasite.

4. A lacquer according to claim 1, wherein the zeolite is zeolite A.

5. A lacquer according to claim 1, containing at least one of titanium dioxide, iron oxide and mixed-phase rutile as pigment.

6. A lacquer according to claim 5, wherein the zeolite is a faujasite, is present in from about 1 to 5% by volume of the pigment plus any filler and its average particle size is from about 1 to 3 μm.

Table 2

| | | Gloss values in % based on a standard | | | | | | | |
|---|---|---|---|---|---|---|---|---|---|
| | | Lacquer applied immediately | | | | Lacquer applied after 7 days | | | |
| | | 15' | 30' | 60' | 120' | 15' | 30' | 60' | 120' |
| Example 2 | without zeolite | 74 | 75 | 78 | 80 | 81 | 82 | 85 | 86 |
| | with zeolite | 85 | 85 | 85 | 82 | 88 | 88 | 88 | 88 |
| Example 3 | without zeolite | 60 | 65 | 72 | 76 | 71 | 72 | 76 | 79 |
| | with zeolite | 63 | 70 | 81 | 85 | 67 | 74 | 77 | 79 |
| Example 3 overstoving | without zeolite | 30 | 36 | 43 | 53 | 38 | 42 | 47 | 52 |
| | with zeolite | 34 | 46 | 63 | 74 | 34 | 47 | 54 | 60 |
| Example 4 | without zeolite | 71 | 80 | 89 | 89 | 49 | 71 | 84 | 90 |
| | with zeolite | 83 | 86 | 92 | 94 | 81 | 83 | 89 | 91 |
| Example 4 overstoving | without zeolite | 48 | 66 | 83 | 83 | 28 | 51 | 74 | 85 |
| | with zeolite | 66 | 73 | 83 | 90 | 55 | 62 | 79 | 87 |
| Example 5 | without zeolite | 15 | 38 | 52 | 66 | 34 | 38 | 45 | 62 |
| | with zeolite | 39 | 72 | 85 | 87 | 73 | 74 | 86 | 88 |
| Example 4 overstoving | without zeolite | 6 | 7 | 9 | 20 | 6 | 6 | 7 | 12 |
| | with zeolite | 19 | 28 | 66 | 84 | 22 | 34 | 66 | 81 |
| Example 6 | without zeolite | 15 | 38 | 52 | 66 | 34 | 38 | 45 | 62 |
| | with zeolite | 71 | 84 | 87 | 88 | 79 | 82 | 87 | 88 |
| Example 6 overstoving | without zeolite | 6 | 7 | 9 | 20 | 6 | 6 | 7 | 12 |
| | with zeolite | 51 | 61 | 70 | 84 | 54 | 63 | 71 | 83 |

* * * * *